Figure 1:
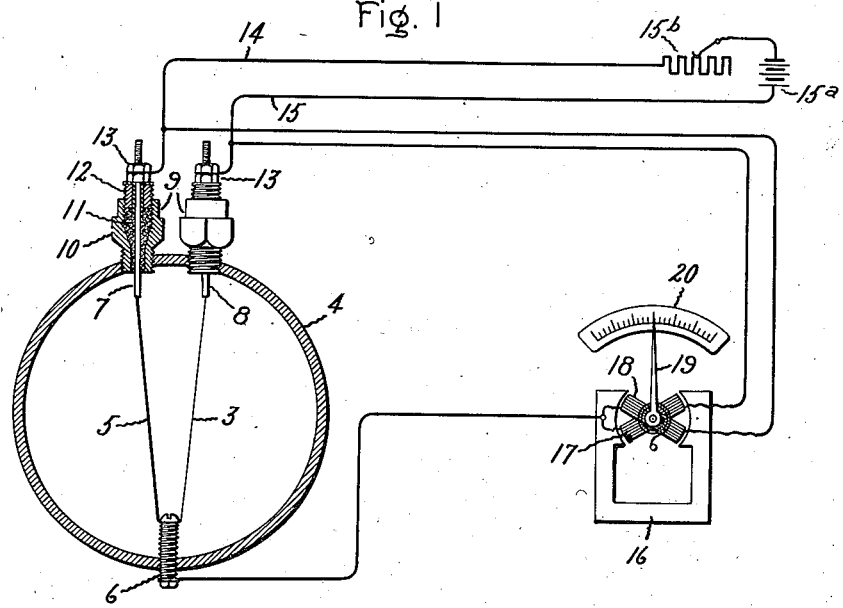

M. A. SAVAGE.
METHOD OF AND MEANS FOR MEASURING THE FLOW OF FLUIDS.
APPLICATION FILED FEB. 14, 1914. RENEWED APR. 29, 1915.

1,156,630.

Patented Oct. 12, 1915.

WITNESSES:

INVENTOR:
MARION A. SAVAGE,
BY
HIS ATTORNEY.

UNITED STATES PATENT OFFICE.

MARION A. SAVAGE, OF SCHENECTADY, NEW YORK, ASSIGNOR TO GENERAL ELECTRIC COMPANY, A CORPORATION OF NEW YORK.

METHOD OF AND MEANS FOR MEASURING THE FLOW OF FLUIDS.

1,156,630.

Specification of Letters Patent.

Patented Oct. 12, 1915.

Application filed February 14, 1914, Serial No. 818,679. Renewed April 29, 1915. Serial No. 24,796.

*To all whom it may concern:*

Be it known that I, MARION A. SAVAGE, a citizen of the United States, residing at Schenectady, county of Schenectady, State of New York, have invented certain new and useful Improvements in Methods of and Means for Measuring the Flow of Fluids, of which the following is a specification.

My invention relates to flow meters for measuring the flow of fluids such as steam, air, etc., and particularly to a new method for effecting such measurements, and a means for carrying out such method.

If a heat radiator, as for example an electrical conductor, be placed in the path of a flowing fluid and raised to a temperature higher than that of the fluid there will be a transfer of heat from the radiator to the fluid, the amount of which will be proportional to the difference in temperature between the radiator and the fluid and to the velocity of flow. From this it follows that other things being known, the rate of flow of a fluid may be measured by measuring its temperature and its cooling effect upon a heat radiator.

As is known, the resistance of a conductor is a function of its temperature. The relative cooling effect upon a radiator in the form of an electrical conductor can, therefore, be determined by measuring at any instant the resistance of the conductor. Also the temperature of a flowing fluid can be determined by means of measuring the resistance of an electrical conductor exposed to the fluid such an arrangement amounting in substance to an electric thermometer. By providing, therefore, two electrical resistances one of which is heated by an electric current flowing therethrough to a temperature higher than that of the fluid to be metered and exposed to the cooling action of the fluid flowing thereover, and the other of which is exposed to and heated by the flowing fluid and measuring the resistances of each, I can deduce therefrom the flow of fluid for any given velocity and temperature. In other words, the ratio of the values of the two resistances to each other, will bear a definite relation to the flow, and by measuring this ratio the flow can be read from suitable tables.

In substance, my improved method comprises measuring the flow of fluid by means of measuring the ratio between two resistances, one of which is heated to a temperature higher than that of the flowing fluid being metered, and is subjected to the cooling action of the fluid flowing thereover, and the other of which is subjected to the temperature of the fluid.

In carrying out my invention, I use a radiator in the form of an electrical resistor heated by an electric current flowing therethrough. This radiator will preferably be of a material having a rather high positive temperature coefficient of resistance and may be arranged in the conduit in any approved manner so as to be fully exposed to the flowing fluid. In general the flow at all points in a conduit is not uniform and for this reason it is preferred that the radiator take a form so as to obtain as nearly an average effect as possible. To this end the same may be a single conductor extending across the tube or the conductor may comprise several strands passing back and forth across the tube. This radiator will also preferably be of quite fine wire and high resistance so as to offer sufficient resistance to produce the desired heating effect. The resistor for measuring the temperature will likewise preferably be of a material having a high temperature coefficient of resistance and will be of such size and resistance that the heating effect of the current will be negligible. This resistor may extend across the conduit or be otherwise arranged, it being only essential that it be subjected to the temperature of the fluid to be metered so as to indicate temperature changes therein, and be unaffected by convection due to the flowing fluid.

Figure 2:
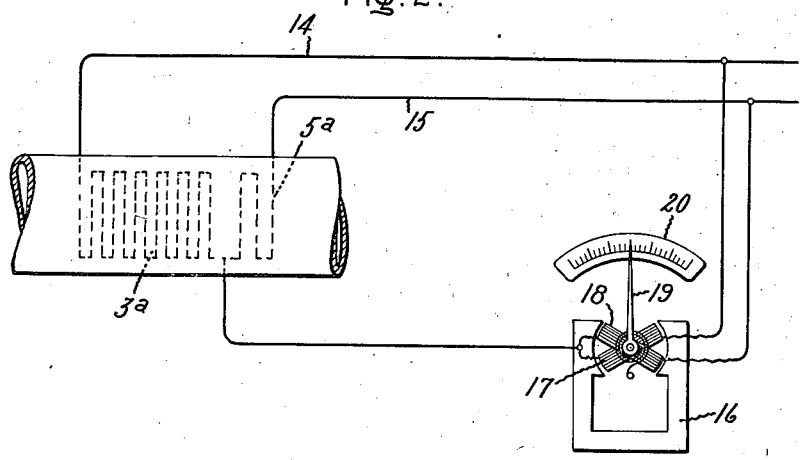

Referring now to the drawing wherein I have illustrated my invention, Figure 1 is a view of a diagrammatic nature showing one form which my invention may take, and Fig. 2 is a modification.

Referring first to Fig. 1, the radiator 3 is here shown as a single electrical resistor extending substantially across a diameter of the conduit 4 through which the fluid to be metered flows. Adjacent the radiator 3 is a second electrical resistor 5 which acts as the resistance element of an electrical thermometer for indicating the temperature, this resistor being also shown as a single conductor. As indicated in the drawing by the relative sizes of the resistors, the radiator 3 has a much higher resistance than the wire 5 and the same are each connected at one end to the common connecting post 6 and at the other end to the conductors 7 and 8 respectively, which pass through insulating plugs 9 to the outside of the conduit. These plugs 9 may be each of the same structure, and comprise essentially a hollow casing 10 threaded into the conduit and filled with a suitable heat and moisture resisting insulating material 11 held in place by the packing gland 12. The outer ends of the conductors 7 and 8 carry suitable binding nuts 13 by means of which the lead wires 14 and 15 are connected. These lead wires may connect with any suitable supply of current as indicated at 15$^a$, the potential on the resistors being controlled by an adjustable resistance 15$^b$. The resistors 3 and 5 are shown as being connected in series, the same current thus flowing through both. This is a convenient arrangement for enabling me to readily measure the ratio of the resistance values.

In carrying out my invention I may use any known or desired means for measuring the resistance of the conductors 3 and 5. In the present instance, I have shown an ordinary form of differential galvanometer 16 having its respective coils 17 and 18 connected across the members 3 and 5 respectively. The pointer 19 of the galvanometer plays across a scale 20, which scale may indicate in any desired units. I may for example calibrate the apparatus so that the scale will read units of flow directly.

The arrangement shown in Fig. 2 is substantially the same as that shown in Fig. 1, except that the resistors 3$^a$ and 5$^a$ corresponding to radiator 3 and resistor 5 of Fig. 1, are shown as comprising several turns. The radiator 3$^a$ may comprise a number of turns which will be suitably distributed across the tube so as to give as nearly an average effect as possible, it being understood that the arrangement of Fig. 2 is wholly diagrammatic.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The method of measuring the flow of fluid through a conduit which consists in measuring the ratio between two resistors having resistances which are variable in accordance with their temperatures, one of which is heated to a temperature higher than that of the fluid being metered and is subjected to the cooling action of the fluid flowing thereover, and the other of which is maintained by contact with the fluid at the temperature of the fluid.

2. The method of measuring the flow of fluid through a conduit having arranged therein two resistors connected in series, resistances which are variable in accordance with their temperatures, one having a higher resistance than the other, which consists in passing an electric current through the resistors to raise the resistor of higher resistance to a temperature higher than that of the flowing fluid and measuring the ratio between the resistances.

3. Apparatus for measuring the flow of fluid through a conduit comprising two electical resistors having resistances which are variable in accordance with their temperatures arranged in the conduit, means for passing an electric current through one of said resistors to heat the same, and means for measuring the ratio of the resistance values of said resistors.

4. Apparatus for measuring the flow of fluid through a conduit comprising a radiator in the form of an electrical resistor of relatively high resistance, a second electrical resistor of relatively low resistance, both said resistors being arranged in said conduit and having resistances which are variable in accordance with their temperatures, means for passing an electric current through said first named resistor to heat the same, and means for measuring the ratio of the resistance values of said resistors.

5. Apparatus for measuring the flow of fluid through a conduit comprising a radiator in the form of an electrical resistor of relatively high resistance, a second electrical resistor of relatively low resistance, said resistors having resistances which are variable in accordance with their temperatures and both said resistors being arranged in said conduit and connected in series, means for passing an electric current through said resistors to heat the radiator, and means for measuring the ratio of said resistances.

In witness whereof, I have hereunto set my hand this 13th day of February, 1914.

MARION A. SAVAGE.

Witnesses:
MARGARET E. WOOLLEY,
HELEN ORFORD.

It is hereby certified that in Letters Patent No. 1,156,630, granted October 12, 1915, upon the application of Marion A. Savage, of Schenectady, New York, for an improvement in "Methods and Means for Measuring the Flow of Fluids," an error appears in the printed specification requiring correction as follows: Page 2, line 71, claim 2, after the word "series" insert the words *and having;* and that the said Letters Patent should be read with this correction therein that the same may conform to the record of the case in the Patent Office.

Signed and sealed this 9th day of November, A. D., 1915.

[SEAL.]
J. T. NEWTON,
*Acting Commissioner of Patents.*